I. B. BLISS.
DEMOUNTABLE RIM FOR WHEELS.
APPLICATION FILED MAR. 10, 1920.

1,359,149.

Patented Nov. 16, 1920.

Inventor
Ira B. Bliss
By his Attorney

UNITED STATES PATENT OFFICE.

IRA B. BLISS, OF STAMFORD, CONNECTICUT.

DEMOUNTABLE RIM FOR WHEELS.

1,359,149. Specification of Letters Patent. Patented Nov. 16, 1920.

Application filed March 10, 1920. Serial No. 364,705.

*To all whom it may concern:*

Be it known that I, IRA B. BLISS, a citizen of the United States of America, residing at Stamford, in the county of Fairfield, State of Connecticut, have invented a new and useful Improvement in Demountable Rims for Wheels, of which the following is a specification.

My present invention addresses itself more particularly to heavy wheels for automobile trucks and vehicles of such nature, although it may be applied with approximately equal facility to lighter vehicles.

I have shown and described it in the present specification in connection with a double tire wheel, but it may be used on a single tire also; the strength and durability of its structure however makes it more available and desirable for double tread wheels.

In a device of this nature it is a prerequisite to so engineer the details as to provide efficient means for preventing the slipping, or creeping, of the parts circumferentially but more especially transversely of the wheel structure proper, and in constructing my present arrangement I have had this end in view at all times, while of course it was equally desirable to lay stress upon the removability of the necessary parts in order to provide the demountable features which was, and is, the main purpose of my invention.

In order to explain my invention more clearly I will describe it in connection with the accompanying drawings which form a part of this specification, and in which Figure 1 represents a side elevation of a wheel partly in section with my invention applied.

Figure 1:
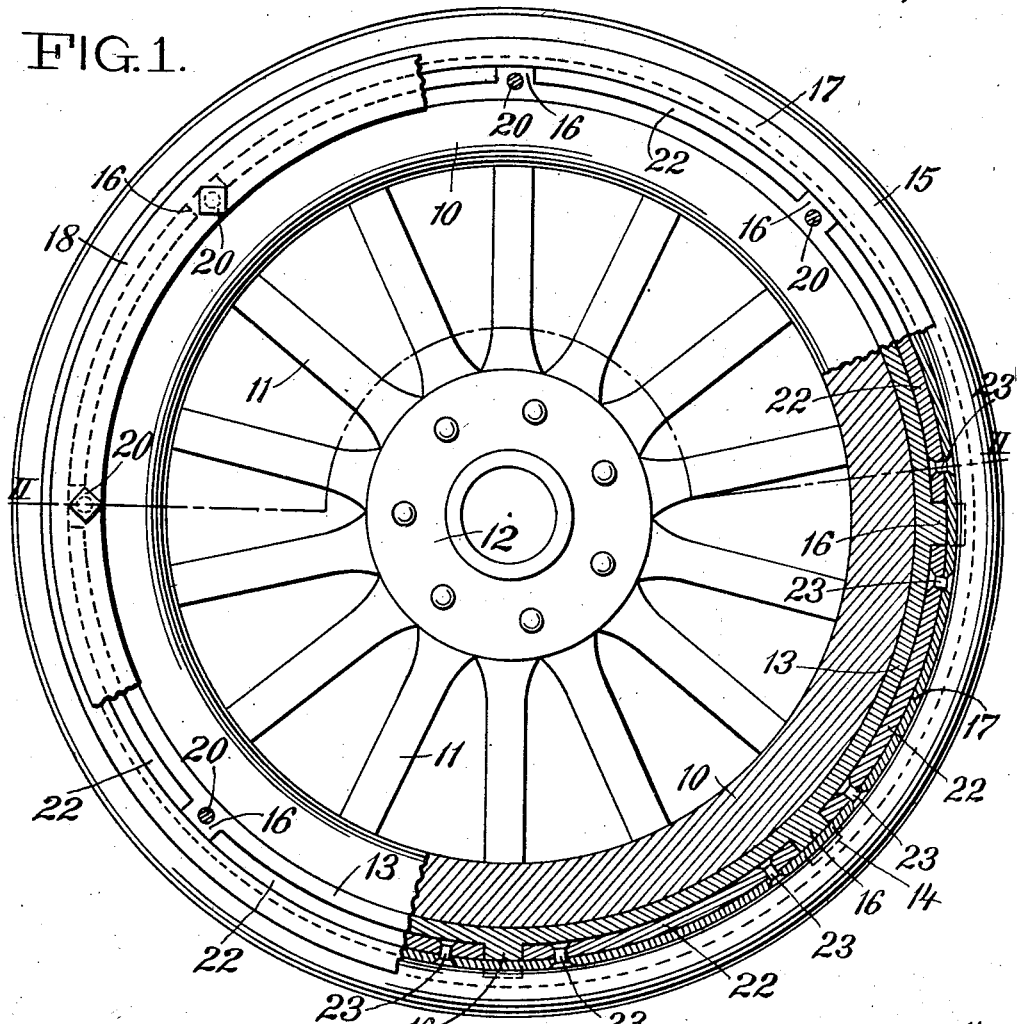

In these drawings 10 represents the main body of the wheel, namely the felly, made of wood or any suitable material, the spokes 11 and the hub 12.

At 13 I show my improved form of felly band; this band is adapted to be shrunk upon the felly the same as usual, my special arrangement being structural in nature and as follows: I form integrally with said band and at its inner edge the posts 14 which constitute stopping, or positioning plates, for the demountable members of the rim as will be explained.

In the drawings as I have illustrated my invention I show a wheel with a double rubber tire 15, but my invention can be applied also to a wheel with a single rubber tire; I have preferred however to show the double tire as my invention is especially adapted for heavy truck wheels, and is engineered to meet a difficulty heretofore unsolved.

Figure 3:
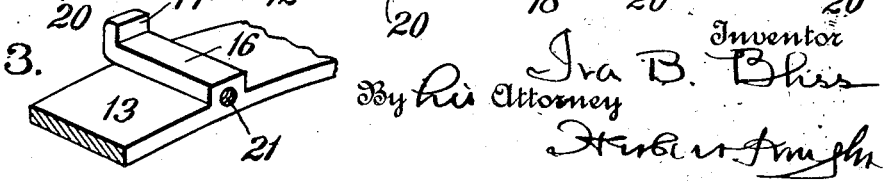
Fig. 3 is a detail view.

The posts 14 are positioned at the inner ends of elevated portions 16 also formed integrally with the band 13; see detail view, Fig. 3; these elevated portions constitute guides and provide locking faces, as will be explained.

Figure 2:
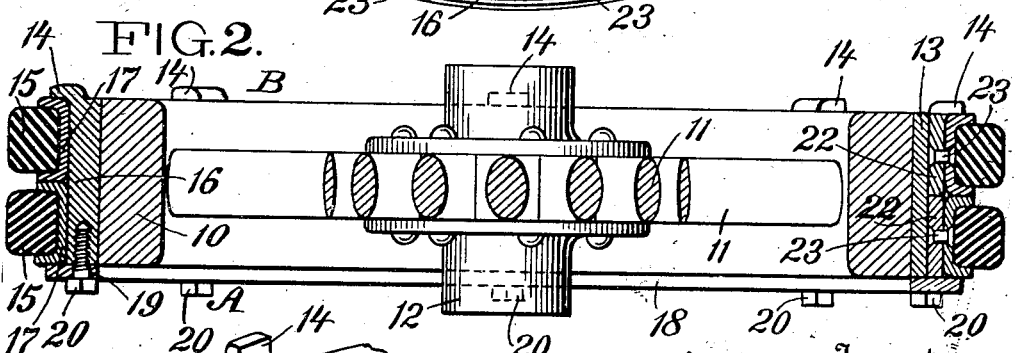
Fig. 2 is a transverse section of same on the line II—II Fig. 1.

The demountable members, two in number, as engineered in the present instance are shown at 17, and are so formed as to slide laterally upon the band 13 from the outside face A of the wheel to the inside face B, see Fig. 2, the posts 14 being placed on the inner face. Each of these members 17 holds and retains its own individual rubber tire 15 and the two units are slid on or off successively.

When in position, as shown in Fig. 2, a plate 18 is placed up against the outer edge of the outer member 17 and is secured to the wheel by screw bolts 19 having boltheads 20. These bolts extend through the plates 18 which latter are formed after the manner of a flat band, as shown in crosssection Fig. 2 presenting its flat or vertical face to the wheel body and the felly band 13; suitable screw holes 21 in said felly band at points coördinating with the ends of the elevated guides 16 provide means for accommodating the said bolts.

At 22 I show filling sectors fixedly secured to the demountable members 17 by rivets 23; these sectors fit in and fill the spaces on top of the band 13, and inside the demountable members 17 and between the elevated guides 16; they constitute not only filling plates but operate as means for preventing circumferential slipping of the demountable members on the felly band.

When one of the demountable members 17 is removed the filling plates or sectors 22 come off with it; they constitute when locked together a single unit.

While these filling plates, or sectors, operate as means for preventing circumferential slipping, or creeping, of the demountable members upon the felly band, the plate, 18, located as shown, constitutes in combination with the posts 14 means for preventing lateral slipping.

It will be seen that while the parts can be easily secured together, or detached for repair or renewal they are firmly bound together and constitute when assembled a satisfactory and powerful demountable rim organization.

Having thus described my invention the following is what I claim as new and useful therein, and desire to secure by Letters Patent:

1. A demountable rim organization embodying a felly band having a series of spaced transverse guides on its outer face, a corresponding series of stopping posts on its inner edge, a laterally sliding rim member mountable on said band and provided with curved sectors to occupy the spaces between the guides, an annular plate and means for locking said plate up against, and onto, the outer ends of the transverse guides.

2. A demountable rim organization embodying a felly band having a series of spaced transverse guides on its outer face, said guides being provided with stopping posts on their inner ends, and having means on their outer ends for receiving a plate locking device, a laterally sliding rim member mountable on said band and provided with curved sectors to occupy the spaces between the guides, an annular plate positioned on the outer face of the organization and a screw bolt for drawing and locking the plate up against the rim at the ends of the guides and thereby forcing the rim against the posts.

3. A demountable rim organization embodying a demountable rim, a felly band, a series of laterally disposed guides formed integrally with the band for preventing circumferential movement of the rim, a series of stops on the inner ends of the guides, an annular plate positioned on the exterior of the organization and screw bolts for drawing the plate up against the rim and forcing the rim against the posts.

IRA B. BLISS.